United States Patent Office 3,808,244
Patented Apr. 30, 1974

3,808,244
PERFLUOROALKYLAMIDO-ALKYL AND ALKYL-THIO ESTERS OF FUMARIC ACID AND OTHER ETHYLENICALLY UNSATURATED POLYBASIC ACIDS AND POLYMERS THEREOF
Eduard Karl Kleiner, Dobbs Ferry, and Martin Knell, Ossining, N.Y., and Pier Luigi Pacini, San Donato Milanese, Italy, assignors to Ciba-Geigy Corporation, Ardsley, N.Y.
No Drawing. Original application May 27, 1968, Ser. No. 732,040, now Patent No. 3,658,857. Divided and this application Jan. 21, 1972, Ser. No. 219,821
Int. Cl. C07c 103/30
U.S. Cl. 260—404.5                12 Claims

ABSTRACT OF THE DISCLOSURE

Monomeric perfluoroalkylamido-alkyl and alkylthio esters of fumaric, maleic, citraconic, mesaconic, itaconic, aconitic, and methylene malonic acid form homopolymers and form copolymers with other ethylenically unsaturated comonomers. The polymers obtained have valuable soil repellent properties and are therefore especially useful in textile finishes. A preferred compound exemplified is bis[2-(n-perfluoroocetanoamido)ethyl] thiofumarate.

THE INVENTION

The invention relates to novel monomers and the polymers which may be prepared from them. The resulting polymers possess excellent soil repellent properties. These polymers provide oil and water repellent finishes useful to treat materials such as textiles, paper, leather, painted wooden and metallic surfaces and the like.

This is a divisional of application Ser. No. 732,040, filed on May 27, 1968, now U.S. Pat. No. 3,658,857.

The monomer compounds of the present invention are of the following formula:

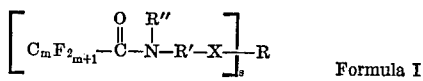

Formula I wherein:

$m$ is an integer of 2 to 18, preferably 6 to 12, and most preferably 6 to 10;

R' is a straight or branched chain alkylene of 2 to 6 carbon atoms, preferably 2;

R'' is hydrogen, or alkyl of 1 to 4 carbon atoms;

X is oxygen or sulfur, preferably sulfur; and

R is an ethylenically unsaturated radical derived from fumaric, maleic, citraconic, mesaconic, itaconic, aconitic, or methylene malonic acid, preferably itaconic or fumaric, most preferably itaconic; and $s$ is an integer of 2 or 3 and is equal to the number of carboxyl groups of the acid from which R is derived, preferably being 2 to correspond to the preferred fumaric and itaconic acids.

The corresponding polymers of the monomers of this invention are those having a skeletal chain comprising repeating units of

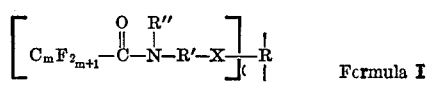

Formula I wherein $m$, R', R'', X, R and $s$ have the same meaning as given in Formula I.

Particularly preferred embodiments of the present invention are polymers of the compounds bis[2-(n-perfluorooctanoamido)ethyl] itaconate and bis[2 - (n - perfluorooctanoamido)ethyl] thiofumarate.

The polymers contemplated by the present invention include homopolymers of the novel fluoromonomers, copolymers with other ethylenically unsaturated monomers, and physical blends of such homopolymers and copolymers together and/or with other polymers.

Since the novel homopolymers and copolymers find substantial use as textile finishes, it is an advantage to include in the monomer mixture from about 0.2 to about 5% by weight of a reactive acrylic, which permits crosslinking either by heat or crosslinking agents. Such reactive fluorocopolymers give textile finishes with superior resistance to washing, dry cleaning, scrubbing, abrasion, and crushing, both wet and dry, and also a better durability of the oil and water repellency.

It is also uniquely advantageous, especially in the preparation of fabric finishes, to use blends of emulsions of the instant fluorinated polymers with emulsions of other polymers such as polyalkyl acrylates and polyalkyl methacrylates, illustrative of which is poly(n-octyl methacrylate).

The monomer compounds of the present invention may be prepared following procedures known to those skilled in the art.

Starting materials employed are generally commercially available and/or may be prepared readily according to methods familiar to those skilled in the art.

It is to be understood that the perfluoroalkyl group may, if desired, be a mixture of varying chain length since basic starting materials are often obtained by telomerization procedures yielding

I groups of varying length.

The ester monomers of this invention can generally be prepared by well known esterification reaction between, for example: acids and perfluorinated alcohols, alkyl esters and perfluorinated alcohols, acid chlorides and perfluorinated alcohols. It is to be understood that the corresponding mercaptans are included by the term 'alcohols.'

Generally the reaction of acid chlorides with the perfluorinated alcohol or mercaptain is preferred since the acid chlorides are easily available and the esterification proceeds readily. An exception, of course, is the case of maleyl chloride and chloromaleyl chloride which do not exist.

The esterifications are carried out preferably in the absence of a base.

The esters of methylene malonic acid generally require a two step synthesis. The intermediate malonesters are made using one of the above esterification techniques and then the methylene malonic ester is formed for example by condensation of the malonester with formaldehyde. See E. Haworth and W. H. Perkin, J. Chem. Soc. 73, 339–345 (1898).

The alcohols and mercaptans used as starting materials in the preparation of the monomer compounds of this invention are either commercially available and/or readily prepared by methods familiar to those skilled in the art.

For example, the reaction of perfluoroalkyl carboxylic esters with hydroxy or mercapto-alkylamines in methanol yields the desired starting material.

As indicated above, the novel monomers of this invention may be homopolymerized or copolymerized with other ethylenically unsaturated comonomers. Polymerization of the monomers may be carried out in bulk, solution, suspensions, or emulsions. The preferred polymerization techniques are emulsion polymerization in an aqueous medium and solution polymerization.

In emulsion polymerization, the monomer or monomers to be polymerized are emulsified together in a water solution of a surface active agent to a given monomer concentration of from about 5% to about 50%. Usually the temperature is raised to between 40° C. and 70° C. to effect polymerization in the presence of an added catalyst. A suitable catalyst may be any one of the commonly known agents for initiating the polymerization of an ethylenically unsaturated compound. The concentration of the catalyst for the polymerization is usually between 0.1% and 2% based upon the weight of the monomers.

Suitable surfactants or emulsifying agents include cationic, anionic or non-ionic types. Since the cationic types can be used in most textile treating baths, they are preferred. The hydrophobic portion of the surfactant may be hydrocarbon or fluorinated hydrocarbon.

Suitable surfactants that may be used include, for example, non-ionic surfactants in which the hydrophilic group is a poly(ethoxy) group and the hydrophobic portion is either a hydrocarbon or a fluorocarbon group such as the ethylene oxide condensates of alkyl phenols, alkanols, alkylamines, alkyl thiols, alkylcarboxylic acids, fluoroalkyl carboxylic acids, fluoroalkyl amides and the like.

Suitable cationic surfactants include for example quaternary ammonium salts or amine salts containing at least one long chain alkyl, fluoroalkyl, or high alkyl substituted benzene or naphthalene group to provide the hydrophobic portion.

Polymerization is preferably carried out for a reaction period adjusted to obtain essentially quantitative conversion of the fluorinated monomer. The optimum reaction time will depend upon the catalyst used and the polymerization temperature and other conditions, but will generally be in the range of from 0.5 to 24 hours.

The polymerization temperature will depend upon the catalyst chosen. In the case of emulsion polymerization in aqueous media, it will generally be in the range of from 20° to 90° C. The polymerization is generally most conveniently and preferably carried out at atmospheric pressure wherever possible.

In solution polymerization, the monomer or monomers are dissolved in a suitable solvent such as fluorinated solvents, for example, fluorohalogenated hydrocarbons, hexafluoroxylene, trifluorotoluene or mixtures thereof with acetone and/or ethylacetate, other fluorinated solvents and the like, and then polymerized in a reaction vessel using initiators such as azobisisobutyronitrile or other azo initiators at concentrations of 0.1 to 2.0% at 40–100° C. under nitrogen.

As mentioned, besides homopolymers, valuable copolymers are obtained by polymerization of the foregoing novel perfluorinated monomers with other polymerizable monomers having ethylene unsaturation.

As a general rule, the preferred comonomer units should have short side chains, since the comonomers with longer side chains generally tend to decrease the soil repellency level.

Examples of suitable comonomers are alkyl vinylethers, such as methyl vinyl ether, isopropyl vinyl ether, isobutyl vinyl ether, vinyl 2-methoxy ethyl ether, n-propyl vinyl ether, t-butyl vinyl ether, isoamyl vinyl ether, n-hexyl vinyl ether, 2-ethylbutyl vinyl ether, diisopropylmethyl vinyl ether, 1-methyl-heptyl vinyl ether, n-decyl vinyl ether, n-tetradecyl vinyl ether, and n-octadecyl vinyl ether.

Also, vinyl ethers of the following amino alcohols: ethanolamine vinyl ether, 2-dimethylamino ethanol vinyl ether, N-hydroxyethyl-m-toluidine vinyl ether, hydroxyethyl butyl aniline vinyl ether, and β-piperidinoethanol vinyl ether, and the like.

Also useful are gamma substituted ethers, such as α-methylvinyl methyl ether, α-methylvinyl ethyl ether, α-amylvinyl methyl ether, and α-phenylvinyl ethyl ether; alicyclic and aralkyl vinyl ethers such as cyclohexanol vinyl ether, menthol vinyl ether, carvacrol vinyl ether, benzyl alcohol vinyl ether, β-phenylethanol vinyl ether, tetrahydro-β-naphthol vinyl ether, β-decahydronaphthol vinyl ether, methylphenyl carbinol vinyl ether, butyl-cyclohexanol vinyl ether, and dihydroabictinol vinyl ether.

Additionally, vinyl aryl ethers such as vinyl phenyl ether, α-bromovinyl phenyl ether, α-phenylvinyl phenyl ether, vinyl m-cresyl ether, α-methyl vinyl p-cresyl ether, vinyl p-chlorophenyl ether, vinyl 2,4,6-trichlorophenyl ether, and vinyl α-naphthyl ether.

Vinyl comonomers with short side chains are preferred. Of all these vinyl ethers, the most preferred ones are: methyl vinyl ether, ethyl vinyl ether n-propylvinyl ether, isopropyl vinyl ether, 2-methoxyethyl vinyl ether and 2-chloroethyl vinyl ether.

Propylene, butylene and isobutylene are preferred α-olefins useful as comonomers with the novel fluoro monomers of the present invention. Straight and branched chain α-olefins are useful with up to 18 carbon atoms in the side chain.

Useful copolymers of the novel perfluorinated compounds of the invention are formed with vinyl esters, e.g. vinyl acetate, vinyl esters of substituted acids, such as for example, vinyl methoxyacetate, vinyl trimethylacetate, vinyl isobutyrate, isopropenyl butyrate, vinyl lactate, vinylcaprylate, vinyl pelargonate, vinyl myristate, vinyl oleate and vinyl linoleate; vinyl esters of aromatic acids, such as vinyl benzoate, vinyl alkoxybenzoates, vinyloctylphthalate, vinyl tetrachlorobenzoate, vinyl β-phenyl butyrate, vinyl β-naphthoate, and vinyl ethyl phthalate; vinylformate and vinylcarbonate derivatives such as vinylformate, vinylchloroformate, methylvinylchloroformate, vinyl methyl carbonate, vinylethylcarbonate, vinylphenylcarbonate and vinylidenecarbonate; vinyl thioesters such as vinyl methyl sulfide, vinyl n-butyl sulfides, 1-chloroethyl vinyl sulfide, 2-chloroethyl vinyl sulfide, vinyl dodecyl, vinyl phenyl sulfide, vinyl o-cresyl sulfide, vinyl 2,5-dimethyl-4-chlorophenyl sulfide, vinyl 8-chloronaphthyl sulfide, and vinyl 2-benzothiazylsulfide.

Preferred of the foregoing vinyl esters are vinylacetate, vinyl propionate, vinylbenzoate, and isopropenylacetate.

Also useful as comonomers are styrene and related monomers which copolymerize readily with the novel esters of this invention such as o-methylstyrene, p-methylstyrene, 3,4-dimethyl styrene, 2,4,6-trimethyl styrene, m-ethyl styrene, 2,5-diethyl styrene, p-butyl styrene, m-t-butyl styrene, p-benzyl styrene, o-methoxy styrene, p-methoxy-styrene, 6-methoxy-3-methyl styrene, 2,6-dimethoxy styrene, and 2-methoxy-5-isopropyl styrene; derivatives of α-methyl styrene, such as: 4-chloro α-methyl styrene, 3,4-dimethyl α-methylstyrene, 3-bromo-2-methyl α-methylstyrene, and 2,5-dichloro-α-methylstyrene; chlorostyrene derivatives, such as m-chlorostyrene, 2,3-dichlorostyrene, 3,4-dichlorostyrene, trichlorostyrene, and pentachlorostyrene; bromo- and fluorostyrene derivatives, such as p-bromostyrene, m-fluorostyrene, m-trifluoromethyl styrene, 4-fluoro-3-trifluoromethyl styrene, and pentafluorostyrene; other styrene derivatives such as p-formylstyrene, methyl ester of p-vinyl benzoic acid, p-vinylbenzyl alcohol 1,4-dimethyl-2-hydroxystyrene, 3,5-dibromo - 4-hydroxystyrene, 2-nitro-4-isopropylstyrene, p-N,N-dimethyl amino styrene, N-(vinyl benzyl) pyrrolidine and sulfoamido styrene; vinyl derivatives of biphenyl, naphthalene and related aromatic compounds, such as 4-chloro-4'-vinyl biphenyl, o-isopropenyl biphenyl, p-vinyl diphenyl oxide, 4-chloro-1-vinyl naphthalene, 1-chloro-4-vinyl naphthalene and 1-vinyl acinaphthalene; vinylfuran, vinylbenzofuran and vinylpyridine, such as 2-vinyl dibenzofuran, 5-ethyl-2-vinyl-thiophene, 5-chloro-2-vinyl thiophene, 3,4,5-trichloro-2-vinyl thiophene and 2-vinyl dibenzothiophene.

Additional useful comonomers are ethylene and chloro-, fluoro- and cyano- derivatives of alkylene, such as ethylene, vinylchloride, vinylidene-chloride, vinylfluoride, vinylidene fluoride, acrylonitrile, methacrylonitrile, tetrafluoroethylene, trifluorochloroethylene, hexafluoropropylene; acrylate and methacrylate monomers, particularly those with 1 to 12 carbon atoms in the ester groups such as monofluoroethyl methacrylate, n-propyl methacrylate, 2-methyl cyclohexyl methacylate, ethylene glycol monomethacrylate, β-bromoethyl methacrylate, β-phenyl ether methacrylate, o-cresyl methacrylate, and β-naphthyl methacrylate, methyl methacrylate, t-butyl methacrylate, n-butyl methacrylate, methylacrylate, ethylacrylate, propylacrylate, butylacrylate, 3-methyl-1-pentylacrylate, octylacrylate, tetradecylacrylate, s-butylacrylate, 2-ethylhexyl acrylate, 2-methoxyethyl acrylate, and phenyl acrylate; α-halogen acrylates, such as methyl chloro acrylate, methyl bromo acrylate, ethyl chloro acrylate, s-butyl chloro acrylate, cyclohexyl chloro acrylate, phenyl chloro acrylate, cyclohexyl bromo acrylate, n-propyl chloro acrylate, isopropyl chloro acrylate, n-butylchloro acrylate, and methyl fluoro acrylate; dienes particularly 1,3-butadiene, isoprene, and chloroprene, 2-fluoro-butadiene, 1,1,3-trifluorobutadiene, 1,1,2,3-tetrafluoro butadiene, 1,1,2-trifluoro-3,4-dichlorobutadiene and tri- and pentafluoro butadiene and isoprene; nitrogen-vinyl monomers such as N-vinylimides, amides, and secondary cyclic amines, like vinyl succinimide, vinyl pyrrolidone, N-vinyl carbazole and the like.

Also useful as comonomers with the novel monomers of the present invention are vinyl monomers which contain perfluorinated side chains. Examples of such perfluorinated monomers are vinyl ethers of the type disclosed in U.S. 2,732,370 and U.S. 2,828,025; vinyl esters containing fluorinated alkyl groups disclosed in U.S. 2,592,069 and U.S. 2,436,144. Other useful monomers are acrylates and methacrylates and derivatives thereof such as those disclosed in U.S. 2,628,958; U.S. 3,256,230; U.S. 2,839,513; U.S. 3,282,905; U.S. 3,252,932 and U.S. 3,304,278.

As mentioned, it may also be desirable to include a minor amount of other reactive comonomers in order to improve the wash and dry-clean properties of the novel textile finishes obtained according to the practice of this invention. Such monomers act as cross-linking agents during the curing operation. Such reactive comonomers are generally employed in amounts of 0.1 to 2%.

During the preparation of the novel monomers of this invention, a small percentage of the half esters is formed as side products and serve as reactive comonomers.

Other reactive monomers which may be included are by way of illustration: acrylic acid, methacrylic acid, acrylamide, methacrylamide, N-methylolacrylamide, 2-hydroxyethylmethacrylate or -acrylate, hydroxypropylacrylates or methacrylates, and t-butylaminoethylmethacrylate or glycidylmethylate. Of the foregoing, N-methylolacrylamide and 2-hydroxyethylmethacrylate are preferred.

Coatings of the homopolymers and copolymers according to the present invention can be prepared and applied from solvent solutions or from aqueous emulsions. Suitable solvents are fluoroalkanes, fluorochloroalkanes, fluoroalkyl-substituted aromatics, alkyl esters of perfluoroalkanoic acids, chlorinated alkanes or aromatics, hydrocarbon aromatics, ketones, esters and ethers. Especially useful as solvents are the fluorinated liquids, and especially α,α,α-trifluorotoluene, otherwise known as benzotrifluoride, hexafluorooxylene and mixtures of these with ethyl acetate or acetone and the like. Concentrations of the fluorinated polymers of the present invention in solvent to provide coatings with effective oil and water repellency properties will generally be of the order of 0.01 to 10% and preferably from 0.1 to 2.0% by weight. Blends of the emulsions of the polymers of this invention with blended emulsions of other polymers and copolymers are particularly useful in textile finishes. The polymers and copolymers are generally of a non-fluorinated type; however, as indicated below other fluorinated polymers and copolymers may be used if desired. Non-fluorinated polymers useful in such blends, include for example, but without limitation, polymers and copolymers of alkyl acrylates and alkyl methacrylates, such as methyl methacrylate, ethyl methacrylate, hexyl methacrylate, and n-octyl methacrylate. A particularly suitable polymer is poly-n-octyl methacrylate. Also useful are polymers and copolymers of acrylic acid, methacrylic acid, styrene, alkyl styrene, butadiene, 2-methyl-1,3-butadiene, 2-chloro-1,3-butadiene; polymers and copolymers of vinyl esters such as vinyl acetate, vinyl butyrate, vinyl laurate, vinyl stearate, vinyl 2-ethyl-hexanoate; polymers and copolymers of vinyl halides and vinylidene halides, such as vinyl chloride, vinylidene chloride, vinyl fluoride, vinylidene fluoride; polymers and copolymers of allyl esters such as allyl propionate, or allyl caprylate; polymers and copolymers of vinyl ketones, such as vinyl methyl ketone, vinyl ethyl ketone, and the like; polymers and copolymers of vinyl ethers such as methyl vinyl ether, cetyl vinyl ether, and the like; polymers and copolymers of acrylamide, methacrylamide, N-methylol acrylamide, N-methylol methacrylamide, N-isopropyl acrylamide, and acrylonitrile and methacrylonitrile.

For example, from about 20 to 97% by weight of a homopolymer of poly(n-octyl methacrylate) blended with the polymers of this invention provides very useful coating compositions which retain surprisingly high repellency ratings even though the relative amount of perfluorinated polymer of this invention is relatively low. Of course, it is understood that besides application to textiles, the coatings of the perfluorinated polymers of the present invention are useful in providing oil and water repellent coatings for leather, paper, wood, masonry, metals, plastics, glass, painted surfaces, and the like. Coatings may be readily applied by various coating techniques, such as those familiar to the art, such as dipping, spraying, brushing, padding, roll coating, and the like.

For evaluation purposes, the textile material in the following examples was dipped in the bath comprising the polymer to be evaluated and the amount of the retained solution adjusted so as to leave approximately 2% of latex by weight of the fabric on the fabric. The fabric is dried at room temperature and then cured in an oven at a temperature of about 175° C. for about 2 minutes.

The type of textile material which is coated is not at all critical. For evaluation purposes, repellency ratings for cotton or wool are determined as a standard screening procedure; however, such fibers such as fiberglass, silk, regenerated cellulose, cellulose esters and ethers, polyamides, polyesters, polyacrylonitrile, polyacrylic esters and other fibers alone or blended or in combination may be coated with the polymers of the present invention.

In the examples below, the repellency ratings were determined as follows:

The AATCC water spray test rating was determined according to Standard Test method 22–1966 of the American Association of Textile Chemists and Colorists, XXXVII, 1961, p. 1952 (also designated ASTM–D 583–58).

Oil repellency is measured by the 3-M-Oil test procedure of Grajek and Peterson, Textile Research Journal, April 1962, p. 323.

The cotton/polyester fabric referred to in the evaluations is a 65% polyester-35% cotton blend. The polyester is one formed from ethylene glycol and terephthalic acid, sold for example under the Dacron trademark.

The following examples describing certain representative embodiments of this invention will serve to further illustrate the nature of this invention. It is to be understood that the examples are merely illustrative, and intended to enable those skilled in the art to practice the invention in all of the embodiments flowing therefrom and do not in any way limit the scope of the invention defined in the claims. Unless otherwise specified, the relationship of parts by weight to parts by volume is that of grams to cubic centimeters, and temperatures are degree centigrade.

EXAMPLE 1

Bis[2-(n-perfluorooctanoamido)ethyl] fumarate

To a refluxing solution of 22.85 parts of 2-(n-perfluorooctanoamido)ethanol (prepared according to Example 1 of U.S. 3,188,340) in 25 parts by volume of acetonitrile, there is added 3.8 parts of fumaryl chloride dropwise with stirring over 15 minutes. Refluxing is continued until no further liberation of hydrogen chloride can be detected (8 hours). The reaction mixture is cooled to room temperature and 12.82 parts of white product melting at 148–154° C. is recovered by filtration. After recrystallization from hot isopropyl alcohol, 10.21 parts of bis[2-(n-perfluorooctanoamido)ethyl] fumarate melting at 151–152.5° C. is obtained.

*Analysis.*—Calculated for $C_{24}H_{12}F_{30}N_2O_6$ (percent): C, 28.99; H, 1.21; N, 2.82; F, 57.32. Found (percent): C, 29.14; H, 1.29; N, 3.37; F, 56.98.

EXAMPLE 2

Bis[2-(n-perfluorooctanoamido)ethyl] itaconate

If in Example 1, 4.18 parts of itaconyl chloride is substituted for the fumaryl chloride, 15.3 parts of crude product is obtained. After two recrystallizations from isopropyl alcohol and one from acetonitrile, the product melts at 106–108° C. and has the correct analysis for bis[2-(n-perfluorooctanoamido)ethyl] fumarate.

*Analysis.*—Calculated for $C_{25}H_{14}F_{30}N_2O_6$ (percent): C, 29.77; H, 1.40; N, 2.78; F, 56.52. Found (percent): C, 29.80; H, 1.26; N, 2.91; F, 56.38.

EXAMPLE 3

Bis[2-(N-ethyl-n-perfluorooctanoamido)ethyl] fumarate (a) 2-(N-ethyl-n-perfluorooctanoamido) ethanol: 2-ethylaminoethanol (4.45 parts) is added dropwise with stirring in 70 minutes to 21.4 parts of methyl perfluorooctanoate. After standing over the week-end at room temperature, a perchloric acid titration indicates that at least 80% of the amine has been converted to amide. The crude product is satisfactory for the next step.

(b) Bis[2 - (N-ethyl-n-perfluorooctanoamido)ethyl] fumarate: By substituting 24.25 parts of N-ethyl-n-perfluorooctanoamidoethanol for the 2-(n-perfluorooctanoamido)ethanol in Example 1, the product obtained is bis-[2-(N-ethyl-n-perfluorooctanomado)ethyl] fumarate.

EXAMPLE 4

Bis[2-(N-ethyl-n-perfluorooctanoamido)ethyl] itaconate

By substituting 24.25 parts of 2-(N-ethyl-n-perfluorooctanoamido)ethanol for the 2-(n-perfluorooctanoamido) ethanol in Example 2, the product is bis[2-(N-ethyl-n-perfluorooctanoamido)ethyl] itaconate.

EXAMPLE 5

Bis[2-(n-perfluorooctanoamido)ethyl] thiofumarate (a) 2-(n-perfluorooctanoamido)ethyl mercaptan: 23.54 parts of methyl perfluorooctanoate are added dropwise to a stirred solution of 8.6 parts of mercaptoethylamine in 50 ml. of methanol. The mixture is stirred for seven minutes and then poured into 200 parts of water. The solid product is filtered and crystallized from 1,1,2-trichlorotrifluoroethane to yield 19.2 parts of 2-(n-perfluorooctanoamido) ethyl mercaptan, M.P. 85–87° C.

The infrared spectrum shows the amide carbonyl absorption at 1720 cm.$^{-1}$ and the OH at 3350° cm.$^{-1}$. The NMR spectrum in $CD_3COCD_3$ (vs. tetramethylsilane) shows a quartet at δ2.8 (S-methylene), a quartet at δ3.6 (N-methylene) and a broad inglet at δ8.5 (NH and/or SH).

*Analysis.*—Calculated for $C_{10}H_6F_{15}NOS$ (percent): C, 25.37; H, 1.27; F, 60.22; N, 2.81; S, 6.77. Found (percent): C, 25.09; H, 1.57; F, 61.47; N, 3.24; S, 6.83.

(b) Bis[2-(n-perfluorooctanoamido)ethyl] thiofumarate: A mixture of 3.06 parts of fumaryl chloride and 18.92 parts of 2-(n-perfluorooctanoamido)ethyl mercaptan was stirred at 95° C. for 1.5 hours while nitrogen was passed through the reaction flask. The product slowly solidified. Eighty parts of hexafluoroxylenedimethyl formamide (1:1) was next added and the solution was kept at 95° C. for an additional thirty minutes. After allowing to cool to room temperature, the product crystallized out and it was filtered and dried to afford 9.1 parts of bis[2-(n-perfluorooctanoamido)ethyl] thiofumarate, M.P. 195–197° C.

*Analysis.*—Calculated for $C_{24}H_{12}F_{30}N_2O_4S_2$ (percent): C, 28.11; H, 1.17; F, 55.53; N, 2.72; S, 6.23. Found (percent): C, 28.09; H, 1.28; F, 54.19; N, 2.95; S, 6.22.

EXAMPLE 6

Bis[2-(n-perfluorobutyroamido)ethyl] thiofumarate (a) 2-(n - heptafluorobutyroamido)ethyl mercaptan: This compound is prepared using a procedure analogous to that of Example 5a but employing stoichiometrically equivalent amounts of methyl heptafluorobutyrate. Yield of 2-(n-heptafluorobutyroamido)ethyl mercaptan is 63% of theoretical. B.P. 105° C. at 13 mm. NMR and IR spectra confirm the desired structure.

(b) Bis[2 - (n - perfluorobutyroamido)ethyl] thiofumarate: The procedure of Example 5b is repeated using stoichiometrically equivalent amounts of 2-(n-heptafluorobuytroamido)ethyl mercaptan in place of 2-(n-perfluorooctanoamido)ethyl mercaptan and using trifluorotoluene as a solvent. The yield is 43% of bis[2-(n-perfluorobutyroamido)ethyl] thiofumarate which melts at 181.5–182° C.

*Analysis.*—Calculated for $C_{16}H_{12}F_{14}N_2O_4S_2$ (percent): C, 30.67; H, 1.93; F, 42.46; N, 4.47; S, 10.23. Found (percent): C, 30.88; H, 1.95; F, 42.48; N, 4.77; S, 10.59.

EXAMPLE 7

Using the procedures described above employing stoichiometrically equivalent amounts of corresponding starting materials, the following compounds of Formula I are obtained.

$$\left[ C_mF_{2m+1} - \overset{O}{\underset{\|}{C}} - \overset{R''}{\underset{|}{N}} - R' - X - \right]_s R$$

| | $C_mF_{2m+1}$ | R'' | X | s | R, derived from— |
|---|---|---|---|---|---|
| a | $(CF_3)_2CF$ | H | S | 2 | Citraconic acid. |
| b | $CF_3(CF_2)_4$ | $CH_3$ | O | 3 | Aconitic acid. |
| c | $CF_3(CF_2)_8$ | H | S | 2 | Fumaric acid. |
| d | $CF_3(CF_2)_{17}$ | H | O | 2 | Maleic acid. |
| e | $(CF_3)_2CF(CF_2)_4$ | $C(CH_3)_3$ | O | 2 | Mesaconic acid. |
| f | $CF_3(CF_2)_{11}$ | $CH_2CH_2CH_3$ | O | 2 | Itaconic acid. |
| g | $CF_3(CF_2)_5$ | H | S | 3 | Aconitic acid. |
| h | $CF_3(CF_2)_2$ | $CH_2CH_3$ | O | 2 | Methylene malonic acid. |
| i | $(CF_3)_3CF$ | H | S | 2 | Fumaric acid. |
| j | $CF_3(CF_2)_{10}$ | H | S | 2 | Itaconic acid. |
| k | $(CF_3)_2CF(CF_2)_6$ | H | O | 2 | Do. |
| l | $(CF_3)_2CF[CF_2CF(CF_3)]_4$ | $CH_3$ | O | 2 | Maleic acid. |
| m | $CF_3[CF_2CF(CF_3)]_5$ | H | S | 2 | Fumaric acid. |
| n | $(CF_3)_2CF(CF_2)_6CF_2CF_2$ | H | O | 2 | Do. |
| o | $CF_3CF_2$ | H | S | 2 | Itaconic acid. |

EXAMPLE 8

100 parts of a mixture of equimolar amounts of bis [2 - (n - perfluorooctanoamido)ethyl] thiofumarate and methylvinylether, 1500 parts of ethylacetate and 1 part of azobisisobutyronitrile are sealed in an ampul under nitrogen and polymerized at 70° C. for 16 hours. The resulting polymer solution is precipitated into 20 times the amount of heptane. The precipitated polymer, a fine, white powder is filtered and dried. Yield: 79.5%.

The analytical data for the resulting alternating copolymer is shown in Table I below.

The polymer is applied to fabric from a 2% solution in hexafluoroxylene, or any other suitable solvent, to provide a fabric coating of 2% by weight of the fabric. The repellency ratings are then determined in the manner described above and are also shown in Table I.

EXAMPLES 9–11

The general procedures as described in Example 8 are repeated but substituting bis[2-(n-perfluorobutyroamido) ethyl] thiofumarate, bis[2 - (n - perfluorooctanoamido) ethyl] fumarate, and bis[2-(n-perfluorooctanoamido) ethyl] itaconate, respectively for the bis[2-(n-perfluorooctanoamido)ethyl] thiofumarate.

The corresponding data is shown in Table I.

Blended fabric of 35% cotton, 65% polyester of terephthalic acid-ethylene glycol available under trademark Dacron.

EXAMPLE 13

100 parts of the monomer bis[2 - (n-perfluorooctanoamido)ethyl] itaconate and 2 parts of 1,1'-azodicyclohexanecarbonitrile are sealed in an ampul under nitrogen. After polymerizing at 110° C. for 16 hours, the polymer is dissolved in 600 parts of hexafluoroxylene and precipitated into 20 times the amounts of heptane. The precipitated polymer, a fine, white powder, is filtered and dried. Yield: 82%—melting point 105° C.

The results of repellency tests are:

|     | 3-M-oil   | AATCC-water |
|-----|-----------|-------------|
| C   | 120 (100) | 79 (70)     |
| W   | 130 (100) |             |
| C/D | 130 (100) | 70 (70)     |

EXAMPLES 14–17

100 parts of a mixture of equimolar amounts of the monomer bis[2 - (n - perfluorooctanoamido)ethyl] thiofumarate and the comonomer (methylvinylether or ethylvinylether or 2-methoxyethylvinylether or isobutylvinylether), 2000 parts of a mixture of hexafluoroxylene and

TABLE I

| Ex. | Fluoro-monomers | F | Repellency 3-M-oil | Repellency AATCC-water | Appearance | $T_g$ (° C.) | $T_m$ (° C.) | E | Calc. | Found |
|---|---|---|---|---|---|---|---|---|---|---|
| 8 | $CH-COS(CH_2)_2NHCOC_7F_{15}$ <br> $\|\|$ <br> $CH-COS(CH_2)_2NHCOC_7F_{15}$ | C <br> W | 130 <br> 140 | 100 <br> 100 | Sl. yellow brittle powder | +110–120 | +185 | C <br> H | 30.35 <br> 1.70 | 29.60 <br> 1.51 |
| 9 | $CH-COS(CH_2)_2NHCOC_7F_7$ <br> $\|\|$ <br> $CH-COS(CH_2)_2NHCOC_7F_7$ | C <br> W | 60 <br> 50 | 70 <br> 70 | White, brittle powder | +76 | +98 | C <br> H | 33.34 <br> 2.65 | 33.74 <br> 2.48 |
| 10 | $CH-COO(CH_2)_2NHCOC_7F_{15}$ <br> $\|\|$ <br> $CH-COO(CH_2)_2NHCOC_7F_{15}$ | C <br> W | 110 <br> 110 | 80 <br> 80 | do | +73 | +103 | C <br> H | 30.81 <br> 1.72 | 31.09 <br> 1.90 |
| 11 | $CH_2=C-COO(CH_2)_2NHCOC_7F_{15}$ <br> $\|$ <br> $CH_2COO(CH_2)_2NHCOC_7F_{15}$ | C <br> W | 110 (100) <br> 130 (120) | 80 (80) <br> 80 (80) | do | +49 | +65 | C <br> H | 31.53 <br> 1.89 | 31.33 <br> 1.80 |

NOTE.—The ratings indicated in parentheses are obtained employing a blend of 40% copolymer and 60% poly(n-octyl methacrylate).

EXAMPLE 12

100 parts of monomer bis[2-(n-perfluorooctanoamido) ethyl] fumarate, 100 parts of hexafluoroxylene and 1 part of tert.-butylperbenzoate are sealed in an ampul under nitrogen. After polymerizing for 16 hours at 120° C., a viscous, yellow solution is obtained which is diluted with 600 parts hexafluoroxylene and precipitated into 20 times the amount of heptane. The precipitated polymer, a white powder, is filtered and dried. Yield: 85% homopolymer.

dimethylformamide (2:1) and 1 part of 1,1'-azodicyclohexanecarbonitrile are sealed in an ampul under vacuum. After polymerizing for 16 hours at 80° C., the resulting polymer solution is precipitated into 20 times the amount of a methanol-water mixture (2:1). The precipitated polymer is washed with methanol.

In the case of each copolymer, the repellency values as shown in Table II below are obtained with a blend of 40% of the fluoro copolymer and 60% of poly(n-octyl methacrylate).

TABLE II

| Example | Comonomer | F | 3-M-oil | AATCC water | Appearance | $T_g$ (° C.) | $T_m$ (° C.) |
|---|---|---|---|---|---|---|---|
| 14 | $CH_2=CH-OCH_3$ | C <br> W | 130 <br> 130 | 90 <br> 90 | Sl. yellow brittle powder | 110–120 | 185 |
| 15 | $CH_2=CH-OCH_2CH_3$ | C <br> W | 120 <br> 120 | 80 <br> 70 | do | | 145–150 |
| 16 | $CH_2=CH-OCH_2CH_2OCH_3$ | C <br> W | 120 <br> 110 | 80 <br> 70 | do | | 130–135 |
| 17 | $CH_2=CH-OCH_2CH(CH_3)_2$ | C <br> W | 100 <br> 100 | | do | | 130–135 |

The repellency is determined as in the previous examples with the results:

|     | 3-M-oil   | AATCC-water |
|-----|-----------|-------------|
| C   | 120 (110) | 79 (70)     |
| W   | 130 (120) |             |
| C/D | 130 (110) | 70 (70)     |

EXAMPLES 18–21

In Example 18, 100 parts of a mixture of equimolar amounts of bis[2 - (n-perfluorooctanoamido)ethyl] fumarate and the comonomer methylvinylether, 300 parts of hexafluoroxylene and 2 parts of azobisisobutyronitrile are sealed in an ampul under nitrogen. After polymerizing for 16 hours at 80° C., the polymer solution is diluted with 600 parts of hexafluoroxylene and precipitated into 20 times the amount of methanol. The precipitated polymer is obtained in over 80% yield.

In Example 19, the procedure of Example 18 is repeated, but employing vinyl acetate as the comonomer. 100 parts of a mixture of equimolar amounts of the monomer bis[2-(n-perfluorooctanoamido)ethyl] fumarate, 400 parts of isopropanol, and 2 parts of 1,1'-azodicyclohexanecarbonitrile are sealed in an ampul under nitrogen. After polymerizing for 18 hours at 80° C., the solvent is removed under high vacuum. The desired copolymer is obtained in 98% yield.

In Example 20, the procedure of Example 18 is employed in this instance employing bis[2-(n-perfluorooctanoamido)ethyl] itaconate and methylvinylether as the comonomer.

In Example 21, the foregoing procedure is employed with bis[2 - (n-perfluorooctanoamido)ethyl] itaconate and styrene as the comonomer.

The analytical and repellency data for Examples 18–21 is shown in the following Table III.

TABLE V

| Example | Composition of blend | | Repellency | | |
|---|---|---|---|---|---|
| | Copolymer of Example 20 | Poly(n-octyl methacrylate) (percent by wt.) | F | 3-M-oil | AATCC-water |
| 27 | 100 | | C | 100 | 80 |
| | | | W | 100 | |
| | | | C/D | 100 | 80 |
| 28 | 40 | 60 | C | 100 | 80 |
| | | | W | 100 | |
| | | | C/D | 100 | 80 |
| 29 | 20 | 80 | C | 100 | 70 |
| | | | W | 100 | |
| | | | C/D | 100 | 80 |
| 30 | 10 | 90 | C | 100 | 70 |
| | | | W | 100 | |
| | | | C/D | 100 | 70 |
| 31 | 5 | 95 | C | 90 | 70 |
| | | | W | 100 | |
| | | | C/D | 100 | 70 |

EXAMPLES 32–36

In Examples 32–36, 2% solutions of the copolymer of bis[2 - (n - perfluorooctanoamido)ethyl] thiofumarate

TABLE III

| Example | Comonomer | Repellency | | | Appearance | Diff. thermal anal. | | Elemental anal. | | |
|---|---|---|---|---|---|---|---|---|---|---|
| | | F | 3-M-oil | AATCC-water | | $T_g$ (°C.) | $T_m$ (°C.) | E | Calc. | Found |
| 18 | $CH_2=CH-OCH_3$ | C | 110 | 80 | White, brittle powder | +73 | +103 | C | 30.81 | 31.09 |
| | | W | 110 | | | | | H | 1.72 | 1.90 |
| | | C/D | 110 | 80 | | | | | | |
| 19 | $CH_2=CH-OCOCH_3$ | C | 120 | | do | −7 | +38 | C | 31.12 | 32.18 |
| | | W | 100 | | | | | H | 1.68 | 2.22 |
| | | C/D | 120 | | | | | | | |
| 20 | $CH_2=CH-OCH_3$ | C | 110 (100) | 80 (80) | do | +49 | +65 | C | 31.53 | 31.33 |
| | | W | 130 (120) | 80 (80) | | | | H | 1.89 | 1.80 |
| | | C/D | 120 (100) | 80 (80) | | | | | | |
| 21 | $CH_2=CH-\bigcirc$ | C | 100 (100) | 80 (80) | do | +59 | +86 | C | 35.62 | 35.51 |
| | | W | 100 (100) | | | | | H | 1.99 | 2.37 |
| | | C/D | 100 (100) | 80 (80) | | | | | | |

EXAMPLES 22–26

In Example 22–26, 2% solutions of the homopolymer of bis[2 - (n - perfluorooctanoamido)ethyl] itaconate of Example 13 and poly(n - octyl methacrylate) are blended in the various ratios shown in following Table IV and the blends applied to fabric as in the foregoing examples and the repellency ratings determined with the results indicated in Table IV.

TABLE IV

| Example | Composition of blend (percent by weight) | | Repellency | | |
|---|---|---|---|---|---|
| | Poly bis[2-(n-perfluoro-octanoamido)ethyl] itaconate | Poly(n-octyl methacrylate) | F | 3-M-oil | AATCC-water |
| 22 | 100 | | C | 120 | 70 |
| | | | W | 130 | |
| | | | C/D | 130 | 70 |
| 23 | 40 | 60 | C | 100 | 70 |
| | | | W | 100 | |
| | | | C/D | 100 | 70 |
| 24 | 20 | 80 | C | 100 | 70 |
| | | | W | 100 | |
| | | | C/D | 100 | 70 |
| 25 | 10 | 90 | C | 100 | 70 |
| | | | W | 110 | |
| | | | C/D | 110 | 70 |
| 26 | 5 | 95 | C | 90 | 70 |
| | | | W | 110 | |
| | | | C/D | 110 | 70 |

EXAMPLES 27–31

In Examples 27–31, 2% solutions of the copolymer of bis[2 - (n-perfluorooctanoamido)ethyl] itaconate and styrene of Example 20 and poly(n - octyl methacrylate) are blended in the various ratios shown in following Table V and the blends applied to fabric as in the foregoing examples and the repellency ratings determined with the results indicated in Table V.

and methylvinylether of Example 8 and poly(n - octyl methacrylate) are blended in the various ratios shown in the following Table VI and the blends applied to fabric as in the foregoing examples and the repellency ratings determined with the results indicated in Table VI.

TABLE VI

| Example | Composition of blend | | Repellency | | |
|---|---|---|---|---|---|
| | Copolymer of Example 8 | Poly(n-octyl methacrylate) (percent by wt.) | F | 3-M-oil | AATCC-water |
| 32 | 100 | | C | 130 | 100 |
| | | | W | 140 | 100 |
| 33 | 40 | 60 | C | 130 | 90 |
| | | | W | 130 | 90 |
| 34 | 20 | 80 | C | 110 | 90 |
| | | | W | 120 | 70 |
| 35 | 10 | 90 | C | 80 | 80 |
| | | | W | 120 | 70 |
| 36 | 5 | 95 | C | 60 | 70 |
| | | | W | 120 | 70 |

While the invention has been explained by detailed description of certain specific embodiments, it is understood that various modifications and substitutions can be made in any of them within the scope of the appended claims which are intended also to include equivalents of such embodiments.

What is claimed is:

1. A compound of the formula:

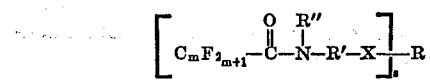

wherein:

$m$ is an integer of 2 to 18;

R' is a straight or branched chain alkylene of 2 to 6 carbon atoms;

R" is hydrogen, or alkyl of 1 to 4 carbon atoms;
X is oxygen; and
R is an ethylenically unsaturated radical derived from fumaric, maleic, citraconic, mesaconic, itaconic, aconitic, or methylene malonic acid; and
$s$ is an integer of 2 or 3 and is equal to the number of carboxyl groups of the acid from which R is derived.

2. A compound as claimed in claim 1 in which $m$ is 6 to 12.

3. A compound as claimed in claim 1 in which R' is ethylene.

4. A compound as claimed in claim 1 in which R" is hydrogen.

5. A compound as claimed in claim 1 in which R is derived from itaconic acid and $s$ is 2.

6. A compound as claimed in claim 1 in which R is derived from fumaric acid and $s$ is 2.

7. A compound as claimed in claim 1 in which R' is ethylene, R" is hydrogen and $m$ is 6 to 12.

8. A compound as claimed in claim 4 wherein $m$ is 6 to 12, R' is ethylene, R is derived from fumaric or itaconic acid and $s$ is 2.

9. A compound as claimed in claim 1 which is bis [2-(n-perfluorooctanoamido)ethyl] fumarate.

10. A compound as claimed in claim 1 which is bis [2-(n-perfluorooctanoamido)ethyl] itaconate.

11. A compound as claimed in claim 1 which is bis [2-(N-ethyl-N-n-perfluorooctanoamido)ethyl] fumarate.

12. A compound as claimed in claim 1 which is bis [2-(N-ethyl-N-n-perfluorooctanoamido)ethyl] itaconate.

References Cited

UNITED STATES PATENTS 3,658,857  4/72  Kleiner et al. _____ 260—404.5

OTHER REFERENCES

Kleiner et al.: Chem. abstracts, 73:36506r.

ETHEL G. LOVE, Primary Examiner

U.S. Cl. X.R.

260—78.4, 78.5, 561 HL